US012691384B2

(12) United States Patent
Yasuda et al.

(10) Patent No.: US 12,691,384 B2
(45) Date of Patent: Jul. 28, 2026

(54) ELECTRONIC DEVICE COVER AND TOY

(71) Applicant: BANDAI CO., LTD., Tokyo (JP)

(72) Inventors: Erika Yasuda, Tokyo (JP); Yuri Okamoto, Tokyo (JP); Megumi Shiina, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 303 days.

(21) Appl. No.: 18/569,110

(22) PCT Filed: Jun. 9, 2022

(86) PCT No.: PCT/JP2022/023387
§ 371 (c)(1),
(2) Date: Dec. 11, 2023

(87) PCT Pub. No.: WO2022/264928
PCT Pub. Date: Dec. 22, 2022

(65) Prior Publication Data
US 2024/0278140 A1 Aug. 22, 2024

(30) Foreign Application Priority Data
Jun. 14, 2021 (JP) ................................. 2021-099067

(51) Int. Cl.
*A63F 13/92* (2014.01)
*A63H 5/00* (2006.01)
(52) U.S. Cl.
CPC ............... *A63F 13/92* (2014.09); *A63H 5/00* (2013.01); *A63H 2200/00* (2013.01)
(58) Field of Classification Search
CPC .............. A45F 2005/008; A45F 5/1516; A45F 5/1508; A45F 2005/002; A44C 5/0007;
(Continued)

(56) References Cited

U.S. PATENT DOCUMENTS

| | | | |
|---|---|---|---|
| 5,008,864 A | 4/1991 | Yoshitake | |
| 5,657,298 A * | 8/1997 | Choay | ................ G04B 37/1413 368/300 |

(Continued)

FOREIGN PATENT DOCUMENTS

| | | |
|---|---|---|
| CN | 209573476 U | 11/2019 |
| CN | 212160383 U | 12/2020 |

(Continued)

OTHER PUBLICATIONS

Mar. 3, 2025, Japanese Office Action issued for related JP Application No. 2022-082665.

(Continued)

*Primary Examiner* — Adam J Waggenspack
(74) *Attorney, Agent, or Firm* — Paratus Law Group, PLLC

(57) ABSTRACT

An electronic device cover includes a first cover portion configured to cover at least a part of an electronic device, the first cover portion being attachable to and detachable from the electronic device. The first cover portion includes a first convex portion configured to fit into a first concave portion provided in the electronic device and a second convex portion configured to fit into a second concave portion provided in the electronic device. When attaching the electronic device cover to the electronic device, a first insertion direction in which the first convex portion is inserted into the first concave portion and a second insertion direction in which the second convex portion is inserted into the second concave portion are different.

18 Claims, 7 Drawing Sheets

(58) Field of Classification Search
CPC . A44C 5/14; A44C 5/147; H04M 1/04; G04B
37/1486; G04B 37/1413; G04G 17/08;
H04B 1/1385; H04B 1/3888; A63F 13/92;
A63H 5/00; A63H 2200/00
USPC ........................................................ 224/165
See application file for complete search history.

(56) References Cited

U.S. PATENT DOCUMENTS

| | | | | |
|---|---|---|---|---|
| 6,568,573 | B2 * | 5/2003 | Manigley | G04B 37/1486 |
| | | | | 224/167 |
| 6,915,900 | B2 * | 7/2005 | Chen | B25H 3/00 |
| | | | | 224/904 |
| 8,345,412 | B2 * | 1/2013 | Maravilla | A45F 5/00 |
| | | | | 361/679.01 |
| 8,584,916 | B1 * | 11/2013 | Chen | A45F 5/021 |
| | | | | 224/904 |
| 9,737,123 | B2 * | 8/2017 | Wright | A45C 13/008 |
| 9,918,541 | B2 * | 3/2018 | Byun | G04G 17/08 |
| 10,537,157 | B2 * | 1/2020 | Partheban | G04G 17/00 |
| 10,542,338 | B2 * | 1/2020 | Ely | H04R 1/02 |
| 2013/0001263 | A1 | 1/2013 | Kai | |
| 2022/0190864 | A1 * | 6/2022 | Prout | H04B 1/3888 |

FOREIGN PATENT DOCUMENTS

| | | | |
|---|---|---|---|
| CN | 213210740 | U | 5/2021 |
| EP | 2937744 | A2 | 10/2015 |
| JP | H03-238937 | A | 10/1991 |
| JP | 3053919 | U | 9/1998 |
| JP | 2001-246149 | A | 9/2001 |
| JP | 2003-234813 | A | 8/2003 |
| JP | 3209654 | U | 3/2017 |

OTHER PUBLICATIONS

Oct. 14, 2021, Japanese Office Action issued for related JP Application No. 2021-099067.
Aug. 23, 2022, International Search Report issued for related PCT Application No. PCT/JP2022/023387.
Aug. 23, 2022, International Search Opinion issued for related PCT Application No. PCT/JP2022/023387.
May 14, 2024, Chinese Office Action issued for related CN Application No. 202210583246.0.
Oct. 31, 2024, Chinese Office Action issued for related CN Application No. 202210583246.0.
Mar. 13, 2025, Chinese Office Action issued for related CN Application No. 202210583246.0.
May 26, 2025, Chinese Office Action issued for related CN Application No. 202210583246.0.

* cited by examiner

*FIG. 1*

ELECTRONIC DEVICE COVER AND TOY

CROSS REFERENCE TO PRIOR APPLICATION

This application is a National Stage Patent Application of PCT International Patent Application No. PCT/JP2022/023387 (filed on Jun. 9, 2022) under 35 U.S.C. § 371, which claims priority to Japanese Patent Application No. 2021-099067 (filed on Jun. 14, 2021), which are all hereby incorporated by reference in their entirety.

TECHNICAL FIELD

The present invention relates to an electronic device cover and a toy including an electronic device and the electronic device cover.

BACKGROUND ART

In the related art, for the purposes of damage prevention, transport, and the like of an electronic device such as a portable game machine, a dedicated storage case is attached to the portable game machine.

For example, Patent Literature 1 discloses a technique of engaging a protrusion of an upper protective cover and a protrusion of a lower protective cover with a concave portion provided in the portable game machine to expose a liquid crystal screen. This enables to protect the portable game machine and to enjoy a game even when carrying it.

CITATION LIST

Patent Literature

Patent Literature: Japanese Patent Application Laid-Open Publication No. 2001-246149

SUMMARY OF INVENTION

Technical Problem

When the electronic device such as a portable game machine is attached to the electronic device cover such as a storage case, the electronic device cover is required to be easily attachable to and detachable from the electronic device and be stably fixed to the electronic device so as not to be removed from the electronic device cover. A main object of the present application is to provide an electronic device cover that satisfies such requirements and a toy including the electronic device cover.

Other problems and new features will be clarified from the description of the present description and the accompanying drawings.

Solution to Problem

An electronic device cover according to one embodiment includes: a first cover portion that is attachable to and detachable from an electronic device and covers at least a part of the electronic device. Here, in the first cover portion, a first convex portion for fitting into a first concave portion provided in the electronic device and a second convex portion for fitting into a second concave portion provided in the electronic device are provided, and when attaching the electronic device cover to the electronic device, a first insertion direction in which the first convex portion is inserted into the first concave portion and a second insertion direction in which the second convex portion is inserted into the second concave portion are different from each other.

A toy according to one embodiment includes: an electronic device; and an electronic device cover that is attachable to and detachable from the electronic device. Here, the electronic device includes a first concave portion and a second concave portion, and the electronic device cover includes a first cover portion that covers at least a part of the electronic device. In the first cover portion, a first convex portion for fitting into the first concave portion and a second convex portion for fitting into the second concave portion are provided, and when attaching the electronic device cover to the electronic device, a first insertion direction in which the first convex portion is inserted into the first concave portion and a second insertion direction in which the second convex portion is inserted into the second concave portion are different from each other.

Advantageous Effects of Invention

In one embodiment, it is possible to provide an electronic device cover that is easily attachable to and detachable from an electronic device and is stably fixed to the electronic device. Also, it is possible to provide a toy including the electronic device cover.

BRIEF DESCRIPTION OF DRAWINGS

FIG. 1 is a perspective view illustrating a toy according to a first embodiment.

DESCRIPTION OF EMBODIMENTS

Figure 2:
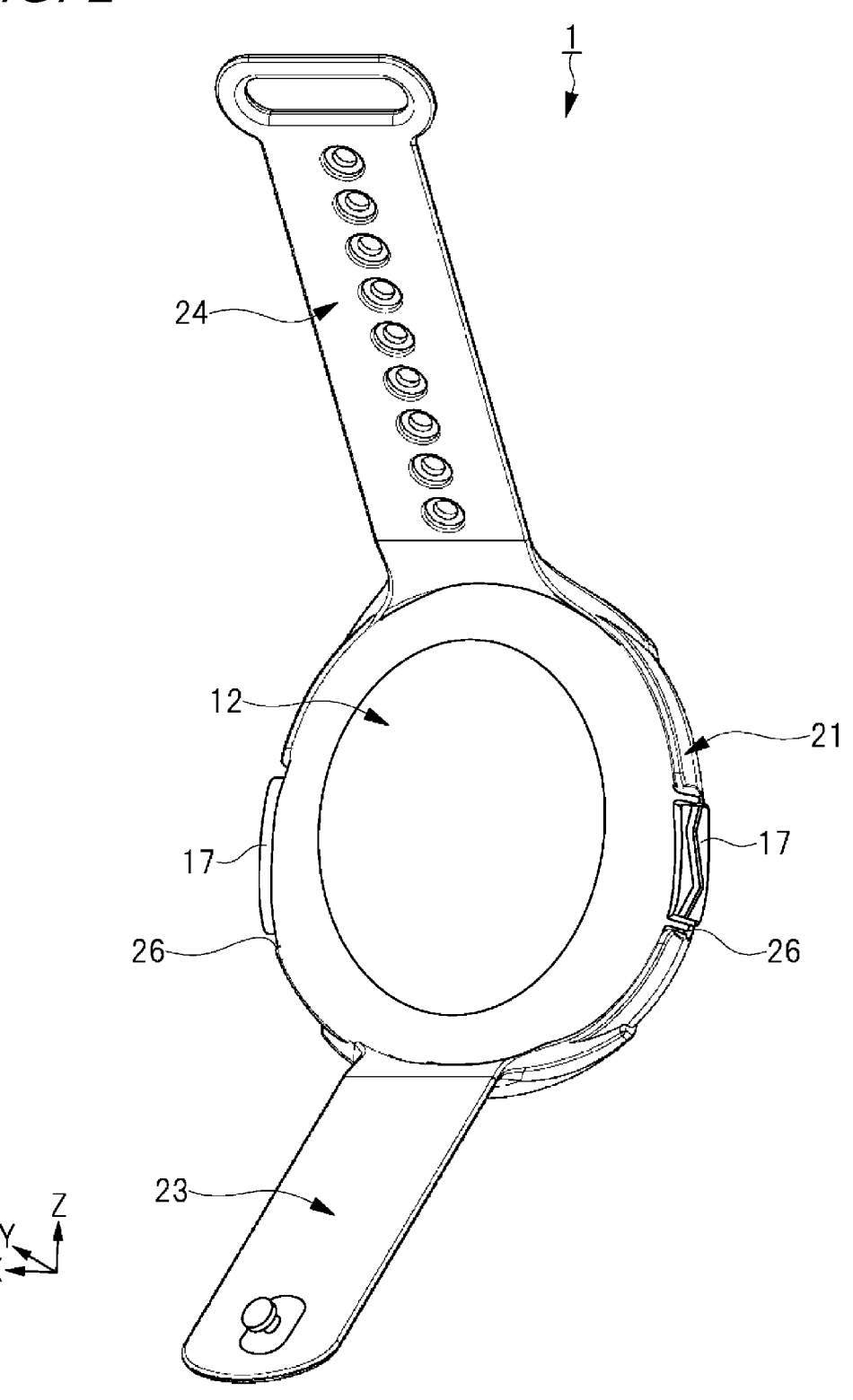
FIG. 2 is a perspective view illustrating the toy according to the first embodiment.

Hereinafter, an embodiment will be described in detail based on the drawings. In all of the drawings for illustrating the embodiment, members having the same functions will be represented by the same reference numerals, and the repeated description thereof will not be made. In the following embodiment, unless particularly required, the description of the same or equivalent portions will not be repeated in principle. An X direction, a Y direction, and a Z direction intersect with each other and are orthogonal to each other.

First Embodiment

Figure 1:
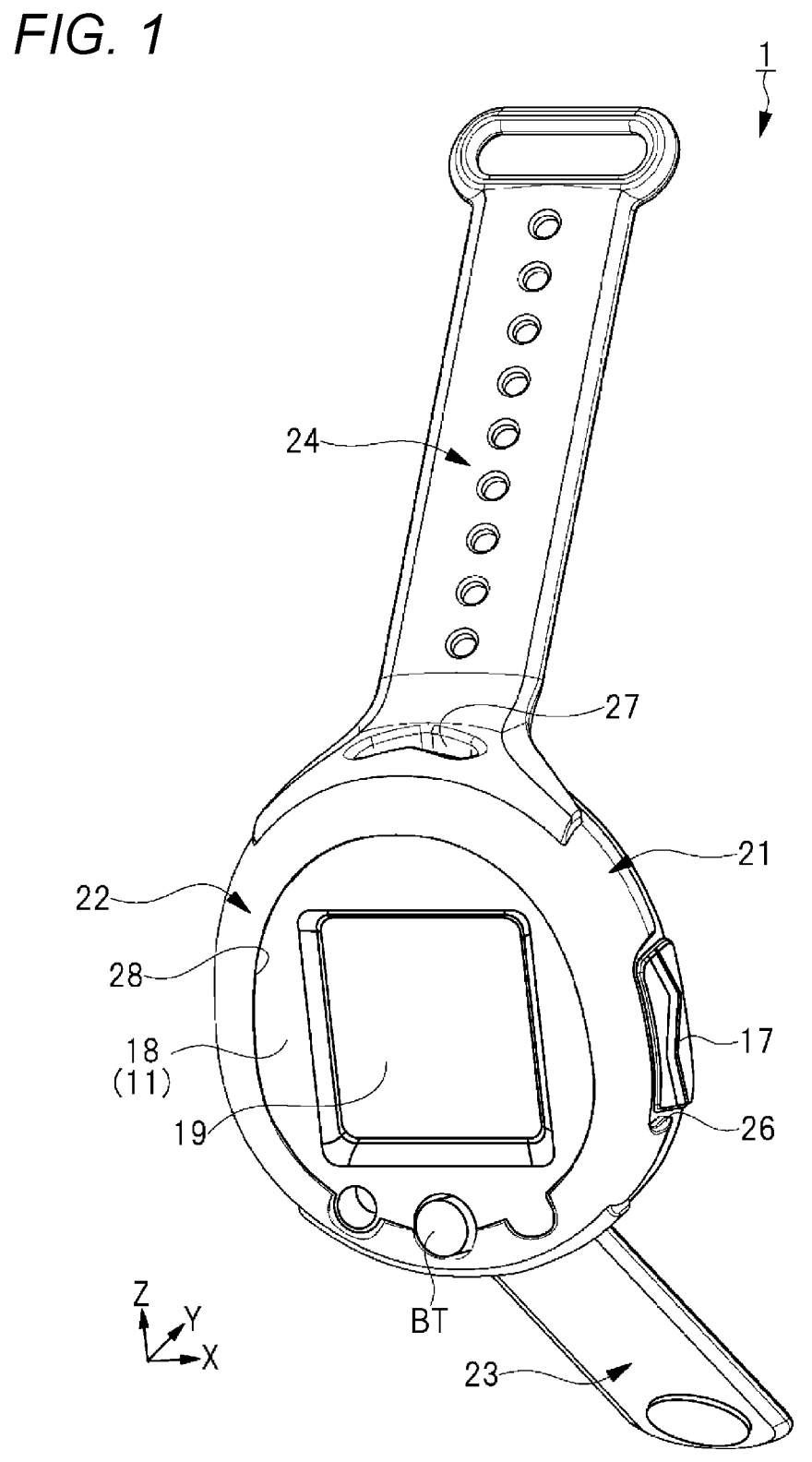

Hereinafter, an electronic device 10, an electronic device cover 20 that is attachable to and detachable from the electronic device 10, and a toy 1 including the electronic device 10 and the electronic device cover 20 will be described using FIGS. 1 to 8. The electronic device 10 is, for example, a game device that can be carried by a user. The electronic device cover 20 is a storage case that protects the electronic device 10 from damages or the like and makes it easy to carry the electronic device 10.

Figure 3:
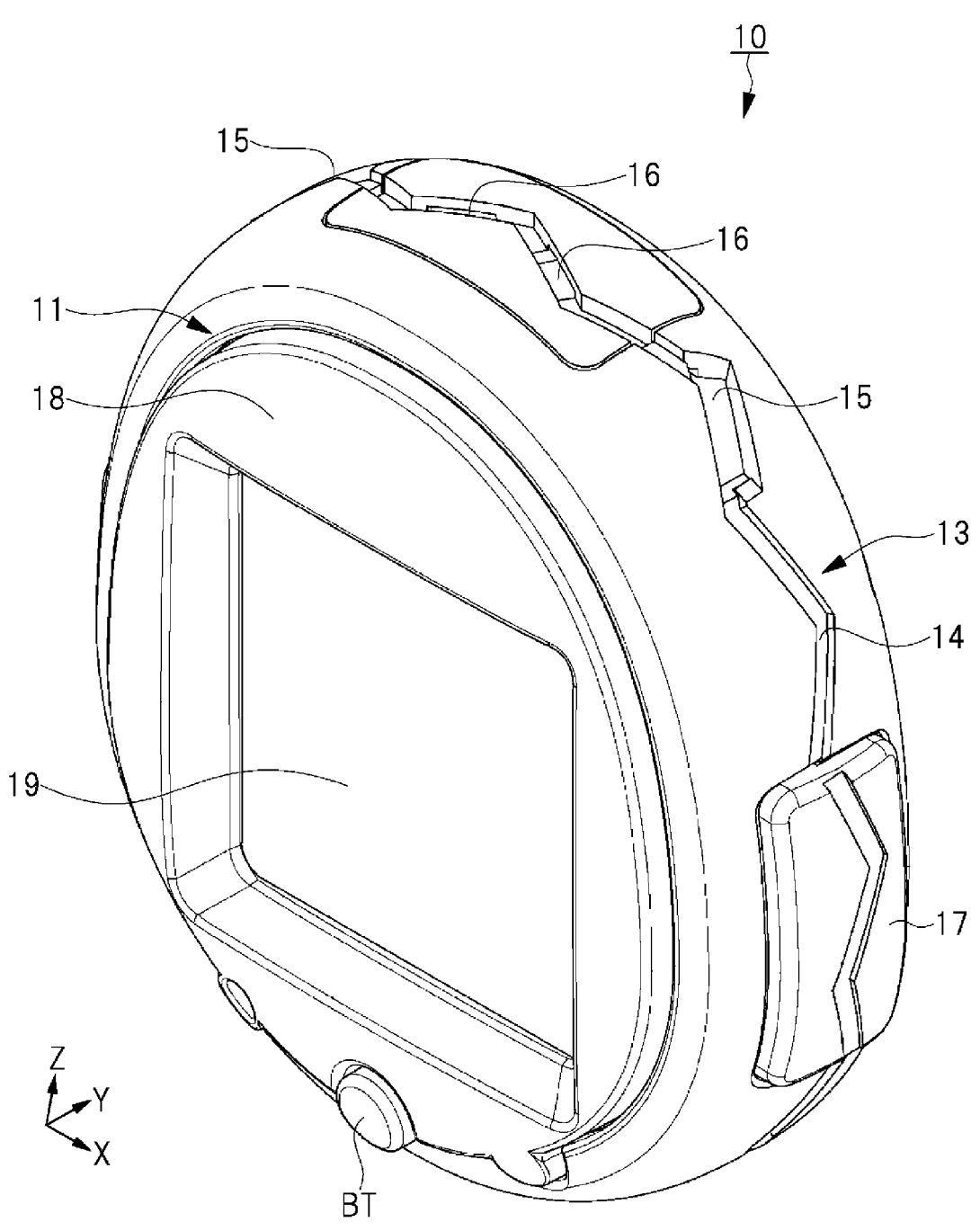
FIG. 3 is a perspective view illustrating an electronic device according to the first embodiment.
Figure 4:
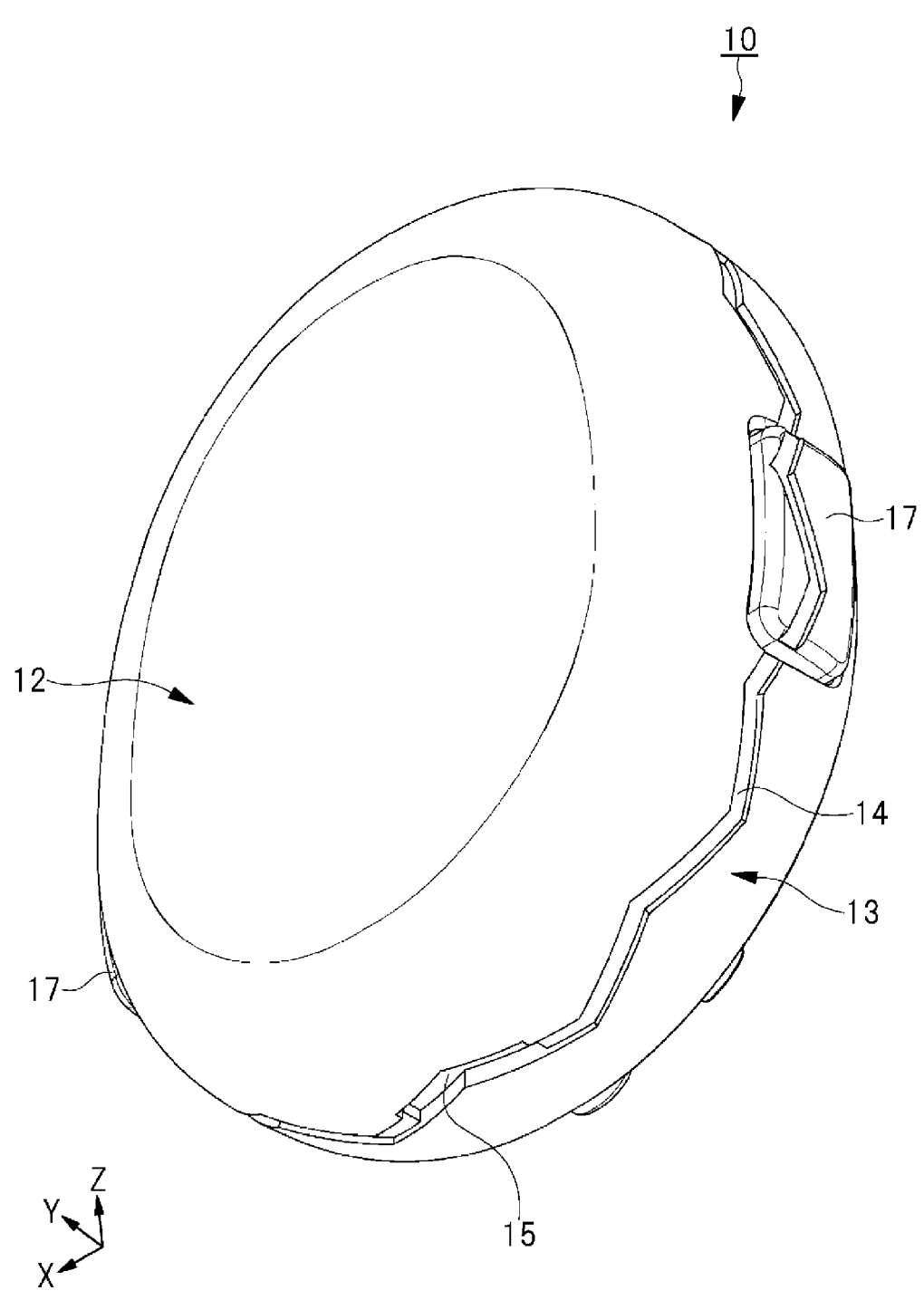
FIG. 4 is a perspective view illustrating the electronic device according to the first embodiment.

FIGS. 1 and 2 illustrate the summary of the toy 1 and illustrates a state where the electronic device cover 20 illustrated in FIGS. 5 to 8 is attached to the electronic device 10 illustrated in FIGS. 3 and 4. As to be described below, a plurality of concave portions 15 are provided in the electronic device 10, and a plurality of convex portions 25 are provided in the electronic device cover 20. By fitting each of the convex portions 25 into each of the concave portions 15, the electronic device cover 20 can be attached to the electronic device 10.

As illustrated in FIGS. 3 and 4, the electronic device 10 includes a front surface portion 11, a back surface portion 12 opposite to the front surface portion 11, and a side surface portion 13 that connects the front surface portion 11 and the back surface portion 12. The outer periphery of each of the front surface portion 11 and the back surface portion 12 forms an oval shape such as an egg shape, an ellipse shape, or an ellipsoidal shape. The side surface portion 13 is provided along the outer periphery of each of the front surface portion 11 and the back surface portion 12, and forms a curved surface in a direction from the front surface portion 11 toward the back surface portion 12.

A decorative groove 14 is provided in the side surface portion 13. The groove 14 is provided substantially over the entire side surface portion 13 and includes a plurality of bent portions. The plurality of concave portions 15 are provided in the side surface portion 13. Here, an example where two concave portions 15 are provided in the upper half of the electronic device 10 and one concave portion 15 is provided in the lower half of the electronic device 10 will be described.

As described above, each of the convex portions 25 is fitted into one of the concave portions 15, and it is desirable that a depth of each of the concave portions 15 is as deep as possible such that the fitting force is strong. Accordingly, the depth of each of the concave portions 15 is more than a depth of the decorative groove 14.

Each of the concave portions 15 is provided inside the groove 14. That is, each of the concave portions 15 is provided as a part of the groove 14. Therefore, it is possible to efficiently dispose each of the concave portions 15 in the side surface portion 13 without deterioration in the aesthetics of the decoration by the groove 14.

Although not illustrated in the drawing, a speaker is built into the electronic device 10. At a position in the groove 14 different from a position where each of the concave portions 15 is provided, a hole 16 is provided to output a sound from the speaker to the outside of the electronic device 10. Here, two holes 16 are provided. However, the number of the holes 16 may be one, or three or more. By also providing the hole 16 inside the groove 14, the aesthetics of the decoration do not deteriorate due to the groove 14.

In the side surface portion 13, a connection portion 17 for an external device is provided to electrically connect the electronic device 10 to the external device. The external device is, for example, a charger or a recording medium. The connection portion 17 for the external device and the external device are connected directly or indirectly through a terminal or the like. In the drawing, a state where a lid is provided on the connection portion 17 for the external device is illustrated on the connection and the decorative groove 14 is provided in the lid. Here, when connecting the external device to the electronic device 10, the user can open the lid to expose the connection portion.

a monitor 19 that is exposed in the front surface portion 11 is built into the electronic device 10. The monitor 19 is, for example, a liquid crystal screen, and the user can recognize a game content or the like by seeing the monitor 19. The monitor 19 may be a touch panel that is operable by the user. A protrusion portion 18 is provided to surround the monitor 19 in the front surface portion 11. For example, when the electronic device 10 is placed on a placement surface such as a floor, the front surface portion 11 may come into contact with the placement surface, and there is a concern that the monitor 19 may be damaged. By surrounding the monitor 19 with the protrusion portion 18, such concern can be reduced. At a position in the front surface portion 11 that does not overlap the protrusion portion 18, a button BT that is operable by the user is provided.

Figure 5:
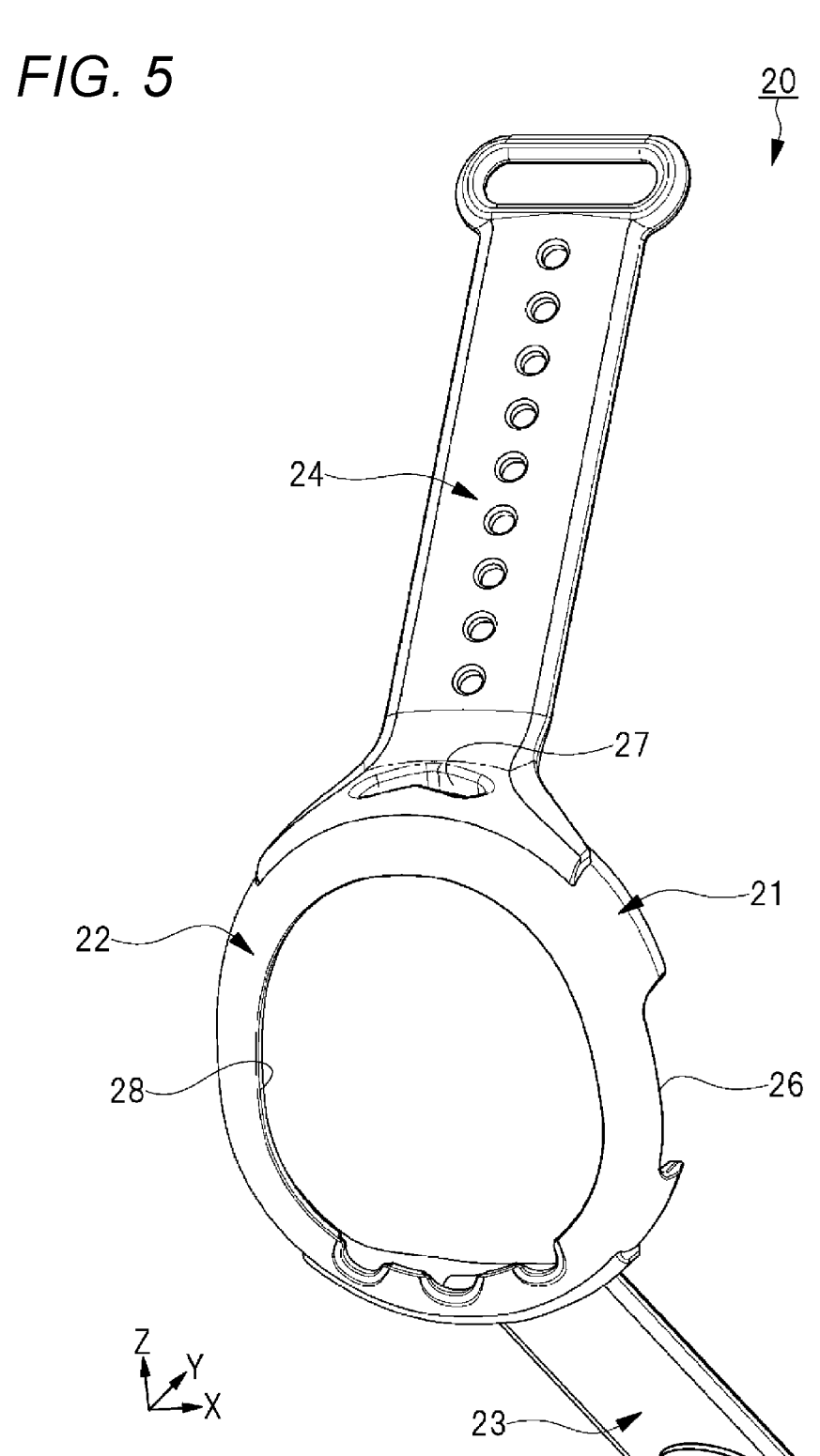
FIG. 5 is a perspective view illustrating an electronic device cover according to the first embodiment.
Figure 6:
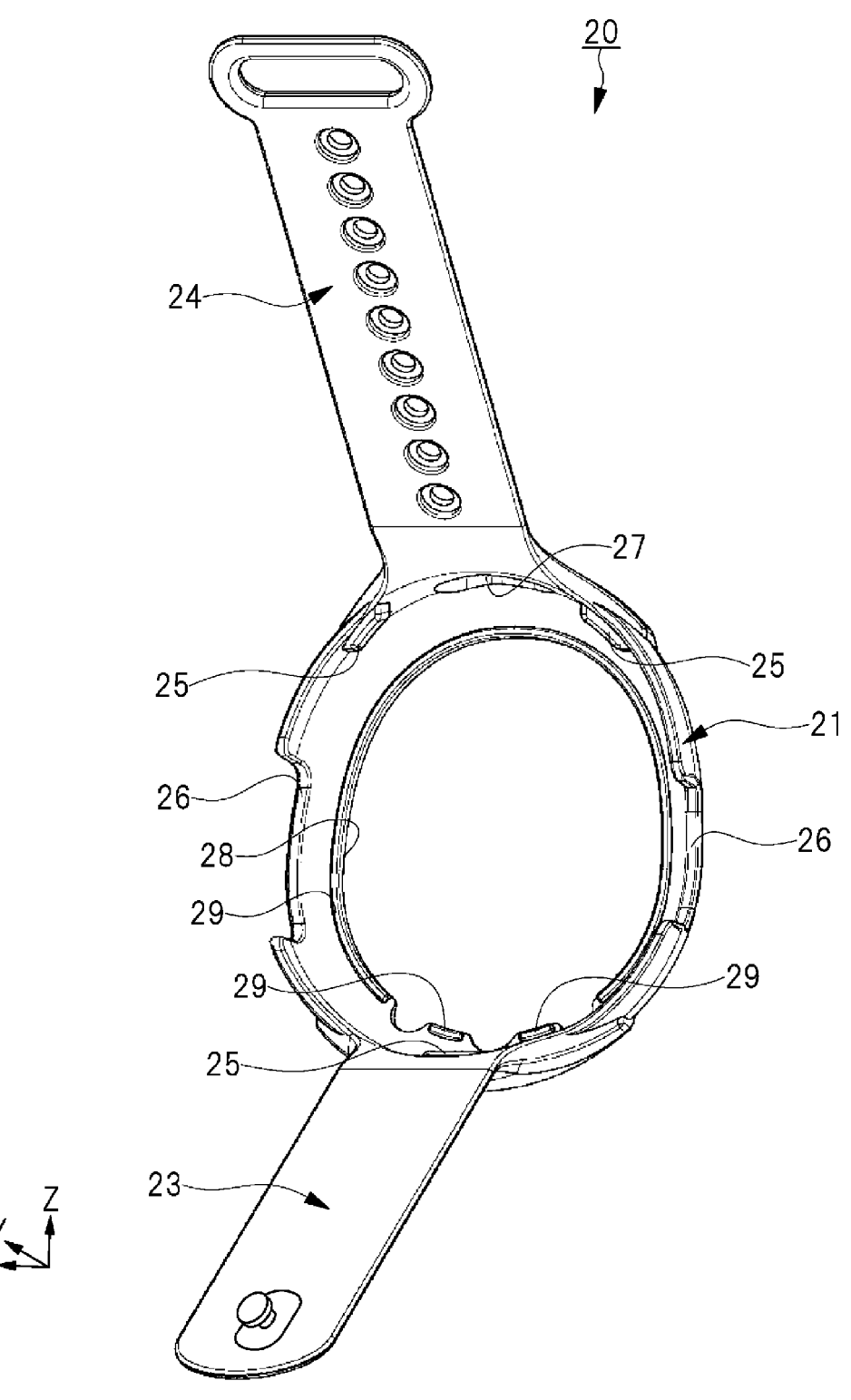
FIG. 6 is a perspective view illustrating the electronic device cover according to the first embodiment.
Figure 7:
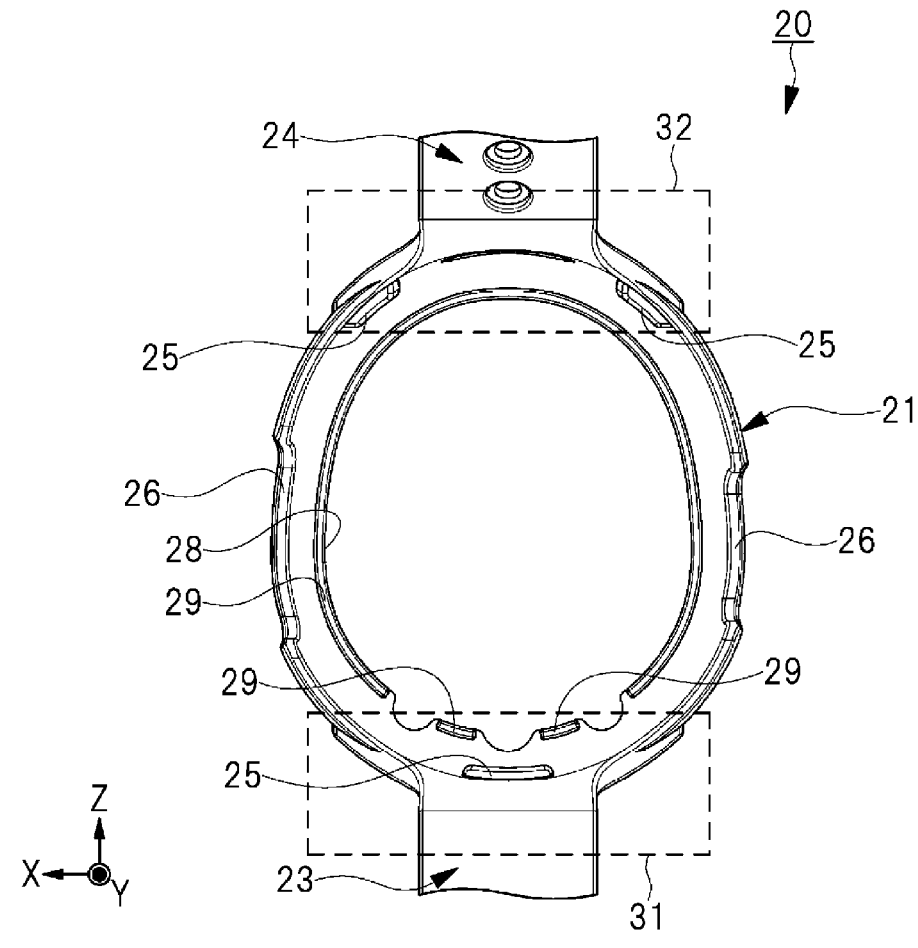
FIG. 7 is a back view illustrating the electronic device cover according to the first embodiment.

As illustrated in FIGS. 5 to 7, the electronic device cover 20 includes a first cover portion 21 that covers at least a part of the electronic device 10, a second cover portion 22 that is integrated with the first cover portion 21, a mounting portion 23 that is connected to the first cover portion 21, and a mounting portion 24 that is connected to the first cover portion 21 at a position different from the mounting portion 23. The first cover portion 21, the second cover portion 22, the mounting portion 23, and the mounting portion 24 are formed of a flexible material or an elastic body, for example, rubber.

The first cover portion 21 is mainly used to cover a part of the side surface portion 13, and the second cover portion 22 is mainly used to cover a part of the front surface portion 11. The mounting portion 23 extends to be away from the first cover portion 21 and the second cover portion 22. The mounting portion 24 extends to be away from the first cover portion 21 and the second cover portion 22 in a direction opposite to the direction in which the mounting portion 23 extends.

A fastener is provided in the mounting portion 23, and a plurality of holes are provided in the mounting portion 24. By fitting the fastener into the hole, the mounting portion 23 and the mounting portion 24 can be combined. This enables the electronic device cover 20 to be wound around an object. For example, the electronic device cover 20 can also be wound around the wrist of the user. Here, as illustrated in FIGS. 1 and 2, when the electronic device cover 20 is attached to the electronic device 10, the user can carry the electronic device 10 like a wrist watch.

As illustrated in FIGS. 6 and 7, a plurality of convex portions 25 are provided in the first cover portion 21 to be fitted into a plurality of concave portions 15. Here, an example where two convex portions 25 are provided in the upper half of the electronic device cover 20 and one convex portion 25 is provided in the lower half of the electronic device cover 20 will be described. By fitting each of the convex portions 25 into each of the concave portions 15, it is possible to easily attach the electronic device cover 20 to the electronic device 10.

In the first embodiment, when the electronic device cover 20 is attached to the electronic device 10, directions in which the convex portions 25 are inserted into the concave portions 15 are different from each other. In other words, directions in which the convex portions 25 protrude from the first cover portion 21 (the protrusion directions of the convex portions 25) are different from each other. Also in the electronic device 10, directions in which the concave portions 15 retract from the side surface portion 13 (retraction directions of the concave portions 15) are also different from each other. By making the directions different from each other, it is possible to hold the electronic device 10 such that the electronic device 10 is sandwiched, to prevent the electronic device cover 20 from being removed from the electronic device 10, and to stably fix the electronic device cover 20 to the electronic device 10.

By holding the electronic device 10 in three different directions using the three convex portions 25, the electronic device cover 20 can be more stably fixed to the electronic device 10. Furthermore, when a triangle is configured by connecting the three convex portions 25 as vertices with virtual straight lines, each of interior angles of the triangle is an acute angle. As in the electronic device 10, when a triangle is configured by connecting the three concave portions 15 as vertices with virtual straight lines, each of interior angles of the triangle is an acute angle. In such relationship, the electronic device cover 20 can more strongly hold the electronic device 10.

Even when four or more convex portions 25 are provided in the electronic device cover 20 and four or more concave portions 15 are provided in the electronic device 10, the electronic device 10 can be more strongly held as long as at least three convex portions 25 and at least three concave portions 15 satisfy the above-described relationship.

Figure 8:
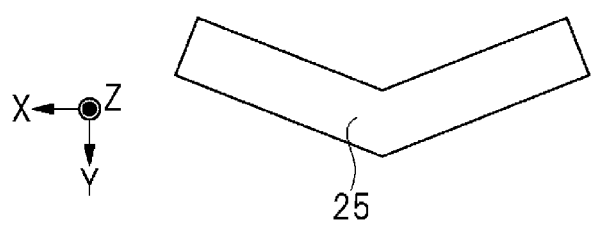
FIG. 8 is a plan view illustrating a shape of a convex portion according to the first embodiment.

As illustrated in FIG. 8, the convex portion 25 may have a bent shape. Here, the concave portion 15 also corresponds to the convex portion 25 and has a bent shape. By making the convex portion 25 and the concave portion 15 to have a bent shape, even when external forces are applied to the convex portion 25 and the concave portion 15 from a plurality of directions while the convex portion 25 and the concave portion 15 are fitted, the convex portion 25 is prevented from being removed from the concave portion 15. Accordingly, the electronic device cover 20 can be more stably fixed to the electronic device 10. Among the plurality of convex portions 25 and the plurality of concave portions 15, only some portions may have a bent shape, or all of the portions may have a bent shape.

As illustrated in FIGS. 5 to 7, an opening portion 26 and an opening portion 27 are provided in the first cover portion 21, and an opening portion 28 is provided in the second cover portion 22. The opening portions 26 to 28 are provided to expose the connection portion 17 for the external device, the hole 16, the monitor 19, and the button BT from the electronic device cover 20. That is, as illustrated in FIGS. 1 and 2, when the electronic device cover 20 is attached to the electronic device 10, the connection portion 17 for the external device is positioned inside the opening portion 26, the hole 16 is positioned inside the opening portion 27, and the monitor 19 and the button BT are positioned inside the opening portion 28.

Even when the electronic device cover 20 is attached to the electronic device 10, the electronic device 10 can be used by the opening portions 26 to 28 same as when the electronic device cover 20 is not provided. That is, the user can also enjoy a game even when carrying the electronic device without deterioration in the function of the electronic device 10 due to the electronic device cover 20.

As illustrated in FIGS. 6 and 7, a protrusion portion 29 is provided in the second cover portion 22 to surround the opening portion 28. When the electronic device cover 20 is attached to the electronic device 10, the protrusion portion 29 surrounds the outer periphery of the protrusion portion 18. That is, by bringing an outer wall of the protrusion portion 18 into contact with an inner wall of the protrusion portion 29, the protrusion portion 18 is fixed by the protrusion portion 29. Accordingly, it is possible to more strongly hold the electronic device 10.

The protrusion portion 29 does not need to completely surround the outer periphery of the opening portion 28, and only needs to surround half or more of the outer periphery of the opening portion 28. That is, the protrusion portion 29 only needs to surround half or more of the outer periphery of the protrusion portion 18. As a result, the above-described effect can be occur.

Incidentally, when removing the electronic device cover 20 from the electronic device 10, basically, it is assumed that the user performs an operation of moving the electronic device cover 20 in a direction from the back surface portion 12 of the electronic device 10 toward the front surface portion 11 thereof, that is, in a depth direction in the drawing in the Y direction of FIG. 7 while holding the mounting portion 23 or the mounting portion 24. To smoothly perform the removal operation, it is preferable that the convex portion 25 is positioned close to the mounting portion 23 or the mounting portion 24. When the convex portion 25 is disposed as such, according to the removal operation, the convex portion 25 is easily become separated from the concave portion 15, and the electronic device cover 20 is easily removed from the electronic device 10.

Accordingly, as illustrated in FIG. 7, the plurality of convex portions 25 are provided adjacent to the mounting portion 23 or the mounting portion 24. A connection region 31 is a region where the first cover portion 21 and the mounting portion 23 are connected, a connection region 32 is a region where the first cover portion 21 and the mounting portion 24 are connected, and the plurality of convex portions 25 are provided in the connection region 31 or the connection region 32.

In other words, the convex portion 25 positioned in the lower half of the electronic device cover 20 (the convex portion 25 in the lower half) among the plurality of convex portions 25 is positioned closer to the mounting portion 23 than the opening portion 26, and the convex portion 25 positioned in the upper half of the electronic device cover 20 (the convex portion 25 in the upper half) among the plurality of convex portions 25 is positioned closer to the mounting portion 24 than the opening portion 26. In other words, a distance between the convex portion 25 in the lower half and the mounting portion 23 and a distance between the convex portion 25 in the upper half and the mounting portion 24 are shorter than a distance between the convex portion 25 in the lower half and the convex portion 25 in the upper half.

As described above, in the first embodiment, it is possible to provide the electronic device cover 20 that is easily attachable to and detachable from the electronic device 10 and is stably fixed to the electronic device 10. Moreover, it is possible to provide the toy 1 including the electronic device cover 20.

Hereinabove, the present invention has been described in detail based on the above-described embodiment. However, the present invention is not limited to the above-described embodiment, and various changes can be made within a range not departing from the scope of the present invention.

REFERENCE SIGNS LIST

1: toy
10: electronic device
11: front surface portion
12: back surface portion
13: side surface portion
14: decorative groove
15: concave portion
16: hole for speaker 17: connection portion for an external device
18: protrusion portion
19: monitor
20: electronic device cover
21: first cover portion
22: second cover portion
23, 24: mounting portion
25: convex portion
26 27, 28: opening portion
29; protrusion portion
31, 32: connection region
BT: button

The invention claimed is:

1. An electronic device cover comprising a first cover portion configured to cover at least a part of an electronic device, the first cover portion being attachable to and detachable from the electronic device, and a first extension portion connected to the first cover portion, the first extension portion forming a portion of a wristband, wherein the first cover portion includes a first convex portion configured to fit into a first concave portion provided in the electronic device and a second convex portion configured to fit into a second concave portion provided in the electronic device, when attaching the electronic device cover to the electronic device, a first insertion direction in which the first convex portion is inserted into the first concave portion and a second insertion direction in which the second convex portion is inserted into the second concave portion are different, the first convex portion and the second convex portion are arranged to sandwich the first extension portion at a first connection region where the first cover portion and the first extension portion are connected, and the first convex portion and the second convex portion protrude toward a virtual line indicating a direction of extension of the first extension portion.

2. The electronic device cover according to claim 1, wherein a third convex portion configured to fit into a third concave portion provided in the electronic device is provided in the first cover portion, and when attaching the electronic device cover to the electronic device, a third insertion direction in which the third convex portion is inserted into the third concave portion is different from the first insertion direction and the second insertion direction.

3. The electronic device cover according to claim 2, wherein when a first triangle is configured by connecting the first concave portion, the second concave portion, and the third concave portion as vertices with virtual straight lines, each of interior angles of the first triangle is an acute angle, and when a second triangle is configured by connecting the first convex portion, the second convex portion, and the third convex portion as vertices with virtual straight lines, each of interior angles of the second triangle is an acute angle.

4. The electronic device cover according to claim 1, further comprising:

a first mounting portion that is connected to the first cover portion and extends to be away from the first cover portion; and a second mounting portion that is connected to the first cover portion and extends to be away from the first cover portion in a direction substantially opposite to the direction in which the first mounting portion extends, wherein the electronic device cover is configured to be wound around an object by combining the first mounting portion and the second mounting portion, the first convex portion is provided adjacent to the first mounting portion, and the second convex portion is provided adjacent to the second mounting portion.

5. The electronic device cover according to claim 1, wherein the electronic device further includes
    a front surface portion,
    a back surface portion opposite to the front surface portion, and
    a side surface portion that connects the front surface portion and the back surface portion and includes the first concave portion and the second concave portion, and the electronic device cover further includes
    the first cover portion configured to cover at least a part of the side surface portion, and
    a second cover portion that is integrated with the first cover portion and covers at least a part of the front surface portion.

6. The electronic device cover according to claim 5, further comprising:

a first mounting portion that is connected to the first cover portion and extends to be away from the second cover portion; and a second mounting portion that is connected to the first cover portion at a position different from the first mounting portion and extends to be away from the second cover portion, wherein the electronic device cover is configured to be wound around an object by combining the first mounting portion and the second mounting portion, the first convex portion is provided in a first connection region where the first cover portion and the first mounting portion are connected, and the second convex portion is provided in a second connection region where the first cover portion and the second mounting portion are connected.

7. The electronic device cover according to claim 6, wherein in the side surface portion, a connection portion for an external device is provided to electrically connect the electronic device to the external device, a first opening portion is provided in the first cover portion, when the electronic device cover is attached to the electronic device, the connection portion for the external device is positioned inside the first opening portion, the first convex portion is positioned closer to the first mounting portion than the first opening portion, and the second convex portion is positioned closer to the second mounting portion than the first opening portion.

8. The electronic device cover according to claim 5, wherein a speaker is built into the electronic device, a decorative groove is provided in the side surface portion, a hole is provided to output a sound from the speaker to an outside of the electronic device, the hole being provided at a position in the groove different from a position where the first concave portion and the second concave portion are provided, a second opening portion is provided in the first cover portion, and when the electronic device cover is attached to the electronic device, the hole is positioned inside the second opening portion.

9. The electronic device cover according to claim 5, wherein a monitor that is exposed in the front surface portion is built into the electronic device, a first protrusion portion is provided to surround the monitor in the front surface portion, a third opening portion and a second protrusion portion that surrounds the third opening portion are provided in the second cover portion, and when the electronic device cover is attached to the electronic device, the monitor is positioned inside the third opening portion and the second protrusion portion surrounds an outer periphery of the first protrusion portion.

10. A toy comprising:

an electronic device; and an electronic device cover that is attachable to and detachable from the electronic device, wherein the electronic device includes a first concave portion and a second concave portion, the electronic device cover includes a first cover portion configured to cover at least a part of the electronic device and a first extension portion connected to the first cover portion, the first extension portion forming a portion of a wristband, the first cover portion includes a first convex portion configured to fit into a first concave portion and a second convex portion configured to fit into a second concave portion, when attaching the electronic device cover to the electronic device, a first insertion direction in which the first convex portion is inserted into the first concave portion and a second insertion direction in which the second convex portion is inserted into the second concave portion are different, the first convex portion and the second convex portion are arranged to sandwich the first extension portion at a first connection region where the first cover portion and the first extension portion are connected, and the first convex portion and the second convex portion protrude toward a virtual line indicating a direction of extension of the first extension portion.

11. The toy according to claim 10, wherein the electronic device further includes a third concave portion, in the first cover portion, a third convex portion configured to fit into a third concave portion is provided, and when attaching the electronic device cover to the electronic device, a third insertion direction in which the third convex portion is inserted into the third concave portion is different from the first insertion direction and the second insertion direction.

12. The toy according to claim 11, wherein when a first triangle is configured by connecting the first concave portion, the second concave portion, and the third concave portion as vertices with virtual straight lines, each of interior angles of the first triangle is an acute angle, and when a second triangle is configured by connecting the first convex portion, the second convex portion, and the third convex portion as vertices with virtual straight lines, each of interior angles of the second triangle is an acute angle.

13. The toy according to claim 10, further comprising:

a first mounting portion that is connected to the first cover portion and extends to be away from the first cover portion; and a second mounting portion that is connected to the first cover portion and extends to be away from the first cover portion in a direction substantially opposite to the direction in which the first mounting portion extends, wherein the electronic device cover is configured to be wound around an object by combining the first mounting portion and the second mounting portion, the first convex portion is provided adjacent to the first mounting portion, and the second convex portion is provided adjacent to the second mounting portion.

14. The toy according to claim 10, wherein the electronic device further includes a front surface portion, a back surface portion opposite to the front surface portion, and a side surface portion that connects the front surface portion and the back surface portion and includes the first concave portion and the second concave portion, and the electronic device cover further includes the first cover portion configured to cover at least a part of the side surface portion, and a second cover portion that is integrated with the first cover portion and is configured to cover at least a part of the front surface portion.

15. The toy according to claim 14, wherein the electronic device cover further includes a first mounting portion that is connected to the first cover portion and extends to be away from the second cover portion, and a second mounting portion that is connected to the first cover portion at a position different from the first mounting portion and extends to be away from the second cover portion, the electronic device cover is configured to be wound around an object by combining the first mounting portion and the second mounting portion, the first convex portion is provided in a first connection region where the first cover portion and the first mounting portion are connected, and the second convex portion is provided in a second connection region where the first cover portion and the second mounting portion are connected.

16. The toy according to claim 15, wherein in the side surface portion, a connection portion for an external device is provided to electrically connect the electronic device to the external device, a first opening portion is provided in the first cover portion, when the electronic device cover is attached to the electronic device, the connection portion for the external device is positioned inside the first opening portion, the first convex portion is positioned closer to the first mounting portion than the first opening portion, and the second convex portion is positioned closer to the second mounting portion than the first opening portion.

17. The toy according to claim 14, wherein a decorative groove is provided in the side surface portion, the first concave portion and the second concave portion are provided inside the groove, and a depth of each of the first concave portion and the second concave portion is more than a depth of the groove.

18. The toy according to claim 17, wherein a speaker is built into the electronic device, at a position in the groove different from a position where the first concave portion and the second concave portion are provided, a hole is provided to output a sound from the speaker to an outside of the electronic device, a second opening portion is provided in the first cover portion, and when the electronic device cover is attached to the electronic device, the hole is positioned inside the second opening portion.

\* \* \* \* \*